United States Patent
Jang et al.

(10) Patent No.: US 12,244,718 B2
(45) Date of Patent: Mar. 4, 2025

(54) BLOCKCHAIN E-VOTING SYSTEM AND OPERATING METHOD THEREOF

(71) Applicant: GWANGJU INSTITUTE OF SCIENCE AND TECHNOLOGY, Gwangju (KR)

(72) Inventors: Jehyuk Jang, Gwangju (KR); Heung-No Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 535 days.

(21) Appl. No.: 17/517,563

(22) Filed: Nov. 2, 2021

(65) Prior Publication Data

US 2022/0141020 A1 May 5, 2022

Related U.S. Application Data

(60) Provisional application No. 63/112,723, filed on Nov. 12, 2020.

(30) Foreign Application Priority Data

| Nov. 4, 2020 | (KR) | 10-2020-0146369 |
| Dec. 9, 2020 | (KR) | 10-2020-0171424 |

(51) Int. Cl.
*H04L 9/32* (2006.01)
*G07C 13/00* (2006.01)
(Continued)

(52) U.S. Cl.
CPC ............ *H04L 9/3218* (2013.01); *G07C 13/00* (2013.01); *H04L 9/0825* (2013.01);
(Continued)

(58) Field of Classification Search
CPC ................. H04L 9/3218; H04L 9/0825; H04L 9/3247; H04L 9/50; H04L 2209/463; G07C 13/00

See application file for complete search history.

(56) References Cited

U.S. PATENT DOCUMENTS

| 11,600,129 B2* | 3/2023 | Oh ........................ H04L 9/3218 |
| 2019/0088062 A1* | 3/2019 | Unagami ................ G06F 21/31 |

(Continued)

FOREIGN PATENT DOCUMENTS

| KR | 10-1837169 B1 | 3/2018 |
| KR | 20200008413 A | 1/2020 |

(Continued)

OTHER PUBLICATIONS

McCorry P, Shahandashti SF, Hao F. A smart contract for boardroom voting with maximum voter privacy. InFinancial Cryptography and Data Security: 21st International Conference, FC 2017, Sliema, Malta, Apr. 3-7, 2017, Revised Selected Papers 21 2017 (pp. 357-375). Springer International Publishing. (Year: 2017).*

(Continued)

*Primary Examiner* — Michael R Vaughan
*Assistant Examiner* — Ethan V Vo
(74) *Attorney, Agent, or Firm* — Heidi Eisenhut; LOZA & LOZA, LLP

(57) ABSTRACT

We disclose a blockchain e-voting system, where keeping the basic principles of voting does not require trusted-third parties. The system includes at least two vote nodes each having two sets of private and public keys, a voter management node, two smart contract modules, and a blockchain. A voter management node is configured to provide a cryptographic base for public key generation and to pre-register DIDs of vote nodes. A first smart contract module is configured to perform self-identification of vote nodes, encryption of votes, and generation of zero-knowledge proofs for (Continued)

the validity of their results, and to upload all the outputs to a blockchain. For the purpose, a vote node executes the first smart contract module, taking a voting decision, an asserted DID, the two sets of public and private keys as inputs, where one set of keys is for the self-identification, and another set is for the encryption. A second smart contract module is configured to download the votes from the blockchain, check the validity of proofs, tally up the results without decrypting them, and finally upload the results to blockchain.

4 Claims, 3 Drawing Sheets

(51) Int. Cl.
  *H04L 9/00* (2022.01)
  *H04L 9/08* (2006.01)
(52) U.S. Cl.
  CPC ............. *H04L 9/3247* (2013.01); *H04L 9/50* (2022.05); *H04L 2209/463* (2013.01)

(56) References Cited

U.S. PATENT DOCUMENTS

| | | | | |
|---|---|---|---|---|
| 2019/0149550 A1* | 5/2019 | Brakeville | ............. | G06F 21/64 726/5 |
| 2019/0158272 A1* | 5/2019 | Chopra | ................ | H04L 9/0637 |
| 2019/0371106 A1* | 12/2019 | Kaye | ....................... | H04L 9/321 |
| 2020/0250912 A1* | 8/2020 | Wu | .......................... | H04L 9/30 |
| 2020/0258338 A1* | 8/2020 | Goswami | ............ | H04W 12/108 |
| 2020/0366495 A1* | 11/2020 | Mahoney | .................. | H04L 9/12 |
| 2021/0248636 A1 | 8/2021 | Park et al. | | |
| 2021/0273780 A1* | 9/2021 | Crintea | ................. | H04L 9/3236 |
| 2022/0035932 A1* | 2/2022 | Baldi | ..................... | G06F 21/606 |
| 2023/0282052 A1* | 9/2023 | Ren | ....................... | H04L 9/3252 235/54 R |
| 2023/0291747 A1* | 9/2023 | Williams | ............ | H04L 63/0861 |

FOREIGN PATENT DOCUMENTS

| | | |
|---|---|---|
| KR | 10-2020-0012705 A | 2/2020 |
| KR | 10-2020-0085204 A | 7/2020 |
| KR | 10-2020-0087913 A | 7/2020 |

OTHER PUBLICATIONS

Hardwick FS, et al. E-voting with blockchain: An e-voting protocol with decentralisation and voter privacy. In2018 IEEE International Conference on Internet of Things and IEEE Green Computing and Communications and IEEE Cyber, Physical and Social Computing and IEEE Smart Data Jul. 30, 2018 pp. 1561-1567 (Year: 2018).*
Korean Appln. No. 1020200171424. Examination Report (untranslated, Feb. 15, 2022).
Yang et al. "Blockchain voting: Publicly verifiable online voting protocol without trusted tallying authorities." Future Generation Computer Systems 112, 859-874 (Jun. 2020).

* cited by examiner

BLOCKCHAIN E-VOTING SYSTEM AND OPERATING METHOD THEREOF

CROSS-REFERENCE TO RELATED APPLICATIONS

The present application claims priority under 35 U.S.C. 119 and 35 U.S.C. 365 to Korean Patent Application Nos. 10-2020-0146369, filed on Nov. 4, 2020, and 10-2020-0171424, filed on Dec. 9, 2020, and U.S. Provisional Application No. 63/112,723, filed on Nov. 12, 2020, which are incorporated by reference herein in their entireties.

BACKGROUND

The present disclosure relates to an electronic voting (e-voting) system using a blockchain.

As an example, the present disclosure relates to an e-voting system using a blockchain capable of zero-knowledge proof that does not require trusted tallying authorities.

As an example, the present disclosure relates to an e-voting system using a blockchain based on a smart contract.

As an example, the present disclosure relates to a voting system based on a smart contract, capable of zero-knowledge proof that does not require trusted tallying authorities.

An e-voting system using an online system is cost-effective and allows opinions to be expressed anytime anywhere. However, it is difficult to keep various basic principles of voting.

In this background, Korean Patent Laid-Open No. 1020200008413 discloses an e-voting system using a blockchain and an operating method thereof. Although the possibility of realization of an online voting has been enhanced by the above patent document, there is a problem in that it largely depends on the trust of the voting commission. In view of the nature of e-voting, depending on the trust of the voting commission is a big problem that makes the practical application of e-voting difficult.

Specifically, the fairness of voting system of the above patent document depends on the trust of voting commission, i.e., a trusted third-party. For example, a third party stores digital IDs (DIDs) of voters and voting rights data corresponding thereto. Therefore, a third party may use the voting rights of others. In other words, the basic principles of e-voting may be damaged by the manipulation of a third party.

In addition, if a third party is a computer program and a server, the possibility that all records may be stolen by hackers cannot be excluded.

Furthermore, a third party may omit specific votes at will.

As described above, if a third party operating on the basis of trust is corrupted, fraudulent voting may occur. In particular, it is a big problem for non-governmental or private organizations with no public trust.

SUMMARY

The present disclosure proposes a blockchain e-voting system, of which the fairness does not depend on trusted third parties, and an operating method thereof.

The blockchain e-voting system of the present disclosure may include at least two vote nodes each having an identification private key, an identification public key, a group encryption private key, and a group encryption public key.

The blockchain e-voting system may include a voter management node that uploads identification data and the public keys of the vote node to the blockchain.

The blockchain e-voting system may include a first smart contract module that receives the public and private keys and the identification data of the vote node, identifies the vote node, generates an identification number, performs group encryption on a vote result, and generates zero-knowledge proofs that ensure correctness of the process.

The blockchain e-voting system may include a second smart contract module that downloads the vote result from the blockchain and confirms the correctness and tallying result of voting without decrypting the vote result.

The first smart contract module may upload the vote result and zero-knowledge proof, on which the group encryption has been performed, to the blockchain.

The operation method of the blockchain e-voting system according to the present disclosure may include generating, by the vote node, an identification public key, an identification private key, a group encryption public key, and a group encryption private key.

The operating method of the blockchain e-voting system may include transmitting, by the vote node, the identification public key and the group encryption public key to the voter management node.

The operating method of the blockchain e-voting system may include uploading, by the voter management node, the identification public key, the group encryption public key, and the identification data of the vote node to the blockchain.

The operating method of the blockchain e-voting system may include connecting, by the vote node, to the first smart contract module and identifying the vote node by comparing the identification data with the held by the vote node identification data uploaded to the blockchain.

The operating method of the blockchain e-voting system may include generating a unique vote node identification number by using the identification public key.

The operating method of the blockchain e-voting system may include generating a first zero-knowledge proof that guarantees the correctness of the identification process and the uniqueness of the vote node identification number.

The operating method of the blockchain e-voting system may include writing one's own choice and performing group encryption thereon.

The operating method of the blockchain e-voting system may include generating a second zero-knowledge proof that guarantees the correctness of one's choice writing process and the group encryption process.

The operating method of the blockchain e-voting system may include uploading, by the first smart contract module, the first zero-knowledge proof and the second zero-knowledge proof for the vote node to the blockchain.

The operating method of the blockchain e-voting system may include uploading the vote result of the vote node to the blockchain.

The operating method of the blockchain e-voting system may include verifying, by the second smart contract module, the first zero-knowledge proof and the second zero-knowledge proof.

The operating method of the blockchain e-voting system may perform tallying based on the vote results.

According to the present disclosure, it is possible to implement e-voting that keeps the basic principles of voting, maintains zero-knowledge proof, and does not depend on the trust of the third party such as the voting commission.

DETAILED DESCRIPTION OF THE EMBODIMENTS

Figure 1:
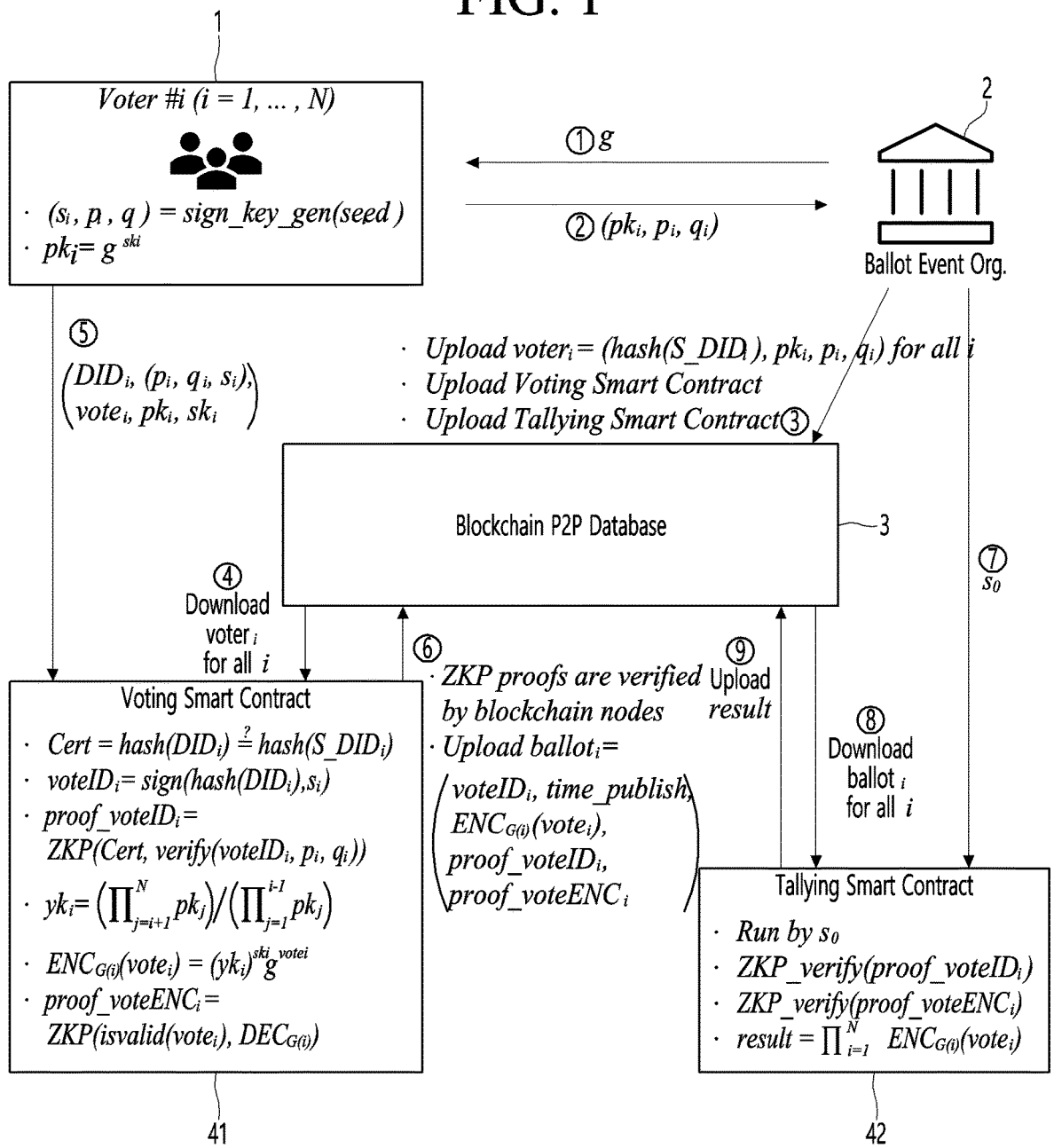
FIG. 1 is a configuration diagram of a blockchain e-voting system according to an embodiment.

First, various technical elements used in the description of embodiments of the present disclosure are defined.

<Blockchain>

A blockchain is a database that exists on an Internet peer-to-peer network. The blockchain includes blocks connected to each other, and each of the blocks includes a plurality of transactions. At least one of data or smart contract is recorded on the transaction. An unverified transaction pool exists outside the blocks. The unverified transaction pool is a temporary storage for storing unverified transactions. Data recorded on the blockchain cannot be forged or altered. No permission is required to read the data recorded on the blockchain. That is, anyone can access the data.

A procedure for a user to upload data to the blockchain undergoes a propagation step, a verification step, and a publication process. Details thereof are as follows. First, the user converts data into the form of transaction, inserts the transaction into an unverified transaction pool, and propagates the unverified transaction pool. A number of verifier nodes in the network verify transactions of the unverified transaction pool. If the verification of the unverified transactions is finished, the unverified transaction is published in the block through consensus among the verifiers. If the blockchain used is a public blockchain, the verifier nodes may be a number of unspecified nodes, and if the blockchain used is a private blockchain, the verifier nodes may be a preselected blockchain manager.

<Zero-Knowledge Proof>

The zero-knowledge proof is a proving protocol in which a prover convinces a verifier that a certain statement is true. In this case, the zero-knowledge proving protocol must have zero-knowledge property that does not transmit, to the verifier, private information other than the fact that the statement is true.

When a statement including public information and private information is S, the necessary and sufficient conditions for a proving protocol to be a zero-knowledge proving protocol are completeness, soundness, and zero-knowledge.

The zero-knowledge proving protocol may be divided into two processes: a proving process and a verification process. The proving process is a process of generating a proof after the prover verifies that the statement S is true. The verification process is a process in which the verifier receives a proof from the prover and confirms whether there is any problem in the proof. If there is no problem in the proof, it must be mathematically guaranteed that the prover has correctly performed the self-verification of the statement S.

<Vote Node Identification Number>

The present disclosure includes a signature algorithm used when a vote node generates an identification number. The vote node may be, for example, a terminal that the voter uses to vote.

Examples of the signature algorithm may include Rivest-Shamir-Adleman (RSA) cryptosystem and Elliptic Curve Digital Signature Algorithm (ECDSA) cryptosystem. Other methods may also be applied.

In an embodiment, a signing algorithm using RSA may be used. RSA will be described below in detail.

Each vote node has an identification public key of p and q, and an identification private key of s. The keys are required for generating the identification number of the vote node. A process (sign) of generating a unique identification number by signing personal identification data m of the vote node may be defined as $sing(m,s):=m\hat{\ }s(mod\ q)$. In this document, the operator $\hat{\ }$ stands for power. p, q, and s may be provided according to the RSA system by using any two prime numbers.

A process of verifying the uniqueness of a certain identification number M is $verify(M,p,q):=(M\hat{\ }p(mod\ q))=?(m(mod\ q))$, where $=?$ is an operator that outputs 1 if the two operands are equal to each other and outputs 0 if the two operands are different from each other. Since only one identification public key for one vote node is uploaded to the blockchain, the verification process may prove the uniqueness of the vote node identification number.

<Group Encryption>

The group encryption is used for the tallying and encryption of vote contents. The group encryption is an encryption that enables to add up vote results without decrypting the vote contents. The group encryption of the embodiment is only an example, and other methods may be applicable.

The process of group encryption will be described below.

There is a group G of N vote nodes. First, each vote node may have two group encryption public keys and one group encryption private key. The keys are required for group encryption. Each i-th vote node in G may have an arbitrary integer $sk_i$ as the group encryption private key. Using the group private key, each i-th vote node may upload its group encryption public key (e.g., $pk_i:=g\hat{\ }sk_i$) to the blockchain. g is an encryption base for the group G, and is information disclosed to all vote nodes. The encryption base g is an integer. The encryption base g may be generated and distributed by a voter management node.

Group signing key $yk_i$ may be computed by using the public keys of all vote nodes. Formally, the group signing key $yk_i$ of the i-th vote node may be provided by using Equation 1.

$$yk_i := \frac{\prod_{j=i+1}^{N} pk_j}{\prod_{j=1}^{i-1} pk_j} \qquad \text{[Equation 1]}$$

$yk_i$ is the group signing key of the i-th vote node, $pk_i$ is the group public key of the i-th vote node, and N is the number of vote nodes belonging to the group G.

The group encryption ENC of the group G may be given by Equation 2.

$$ENC_{G(i)} := (yk_i)^{sk_i} g^{m_i} \qquad \text{[Equation 2]}$$

$m_i$ is a message that the i-th vote node of the group G wants to carry, that is, the vote contents, and $sk_i$ is the group private key of the i-th vote node.

Tallying may be performed by Equation 3.

For all member indices $i = 1, \ldots, N$ of $G$, [Equation 3]

$$\prod_{i=1}^{N} ENC_{G(i)}(m_i) = g^{\sum_{i=1}^{N} m_i}.$$

$ENC_{G(i)}$ is an encrypted message of the i-th vote node of the group G.

The group encryption will be described as an example. Suppose a group of three vote nodes, i.e., i is from 1 to 3. Each vote node shares the group public key, the group signing key, and the group private key. The encryption base is, for example, 3.

The public key and the private key of each group member may be $sk_1=7$ and $pk_1:=g^{sk_1}=3^7=2187$, $sk_2=5$ and $pk_2:=g^{sk_2}=3^5=243$, and $sk_3=4$ and $pk_3:=g^{sk_3}=3^4=81$.

When the private key and the public key of each group member are determined as described above, the group public key $yk_i$ of each group member may be generated by using Equation 1 above.

The group public key of each group member may be $$yk_1 = pk_2 \cdot pk_3 = 3^5 \cdot 3^4 = 3^9,$$

$$yk_2 = \frac{pk_3}{pk_1} = \frac{3^4}{3^7} = 3^{-3}, \text{ and}$$

$$yk_3 = \frac{1}{pk_1 \cdot pk_2} = \frac{1}{3^7 3^5} = 3^{-12}.$$

The voting of each group member is, for example, to attribute at most 5 points per query for three queries. Each group member voted, for example, with 2 points for $m_1$, 4 points for $m_2$, and 1 point for $m_3$.

The group encryption ENC of the i-th group member may be performed by Equation 2 above.

The group encryption result of each group member performed by Equation 2 may be given as follows:

Decision-making encryption of first group member $ENC_{G(1)}=(yk_1)^{sk_1}g^{m_1}=(3^9)^7 3^2=3^{65}$ Decision-making encryption of second group member $ENC_{G(2)}=(yk_2)^{sk_2}g^{m_2}=(3^{-3})^5 3^4=3^{-11}$ Decision-making encryption of third group member $ENC_{G(3)}=(yk_3)^{sk_3}g^{m_3}=(3^{-12})^4 3^1=3^{-47}$ Tallying may be performed by calculating Equation 3. When the tallying of each group member is performed by using Equation 3, the tallying is given as follows:

$$\prod_{i=1}^{3} ENC_{G(i)} = ENC_{G(1)} \cdot ENC_{G(2)} \cdot ENC_{G(3)}$$

$$= 3^{65} \cdot 3^{-11} \cdot 3^{-47}$$

$$= 3^7 ..$$

Consequently, if the tallying result is 3^7 and a discrete logarithm with a base of 3 (encryption base) is taken, 7 is calculated. According to this result, the intention of each vote node cannot be exposed because no message is decrypted during the tallying process. Nevertheless, the aggregation of vote results can be calculated.

Of course, the present disclosure can use other group encryption methods than that used in the embodiment.

<Smart Contracts>

Smart contracts may be provided in the form of programs. After an input is received and a specified operation is performed thereon, an output may be recorded and uploaded on a new transaction. The operations supported by smart contracts include all operations supported by turing-complete language, and include the operations used in the zero-knowledge proving protocol. A program written in a smart contract may be referred to as a smart contract module. Smart contract modules may be provided by the voter management node.

In an embodiment, the smart contract module may include a first smart contract module that executes voting, and a second smart contract module that executes tallying.

FIG. 1 is a configuration diagram of a blockchain e-voting system according to an embodiment.

Referring to FIG. 1, a voter management node 2 may provide an encryption base g of a group G to each vote node (①). The voter management node 2 may obtain a public key of each vote node 1 (②), and may register the obtained public key to a blockchain 3 together with identification information (DID, iris, fingerprint, etc.) of each vote node 1 held by the voter management node (③). The voter management node 2 may upload the smart contract modules to the blockchain 3 (③).

The first smart contract module 41 downloads all registered identification information of all vote nodes (④). Then, each vote node 1 runs the first smart contract module 41 with a DID held by the vote node itself, a signature public key, a signature private key, a group encryption public key, a group encryption private key (⑤), and vote content message ($vote_i$) as inputs.

Using the information from blockchain and inputs taken by each i-th vote node, the first smart contract module 41 may generate the certification of vote node identification test (Cert), vote node identification number ($voteID_i$), and zero-knowledge proof ($proof\_voteID_i$) for the validity of the vote node identification certification. In addition, the first smart contract module 41 may generate a group signing key $yk_i$, may perform group encryption ($ENC_{G(i)}(vote_i)$), and may generate zero-knowledge proof ($proof\_voteENC_i$) for the validity of group encryption.

The first smart contract module 41 uploads a vote result ($ballot_i$) of the i-th vote node to the blockchain 3 (⑥). The vote result ($ballot_i$) is an array of data including vote node identification number ($voteID_i$), the zero-knowledge proof ($proof\_voteID_i$) for the validity of vote node identification certification, the vote execution time (time_publish), the group signing key ($yk_i$) generation, the group encryption ($ENC_{G(i)}(vote_i)$) of vote, and the zero-knowledge proof ($proof\_voteENC_i$) for the validity of group encryption The group signing key is used for the group encryption. A vote content message $vote_i$ of the i-th vote node may be encrypted as the form of the group encryption.

After the voting of all vote nodes is finished, the tallying may be performed. The tallying may be performed by the second smart contract module 42. The second smart contract module 42 obtains an initiation key so for tallying from the voter management node 2. The second smart contract module 42 may perform a tallying of vote results recorded on the blockchain.

The second smart contract module accepts only the most recent vote result ($ballot_i$) if there are two or more results with the same vote node identification number (voteID$_i$). In this manner, the final intention expressed by the vote node may be determined by using the latest information when one vote node has voted more than once.

The second smart contract module 42 may output the sum of vote results without decrypt any message. This has been described in detail through the group encryption.

An operating method of the blockchain e-voting system according to an embodiment will be described with reference to FIG. 1 and related technical elements.

Figure 2:
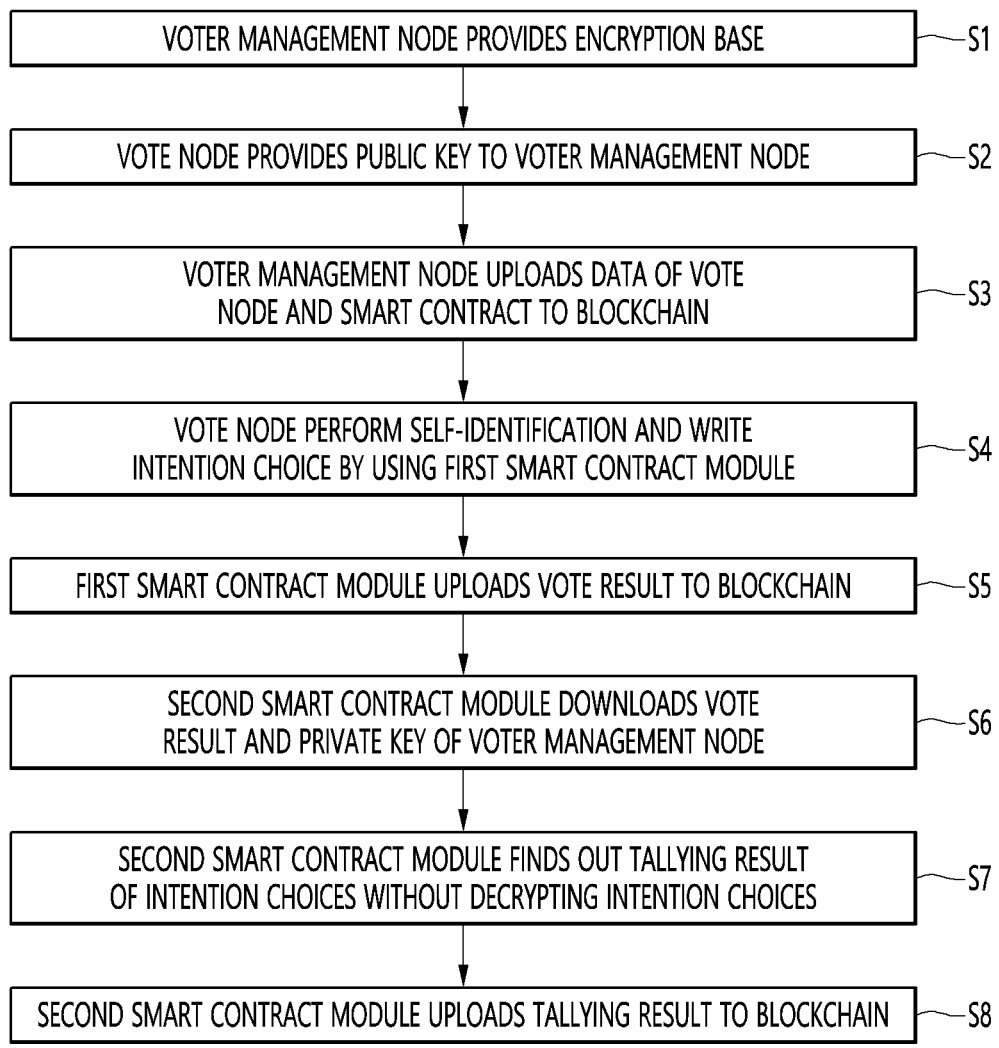
FIG. 2 is a flowchart for describing an operating method of the e-voting system according to an embodiment.

FIG. 2 is a flowchart for describing the operating method of the e-voting system according to an embodiment.

The operating method of the embodiment does not require trusted tallying parties. The operating method of the embodiment does not require a trusted third party to keep the principles of voting. In the operating method of the embodiment, there are only a voter management node hosting the voting and vote nodes participating in the voting. The voter management node may have its own secret key ($s_0$) used to initiate the tallying. A voting may be a procedure of asking decisions of vote nodes for queries on the agenda defined in advance by the voter management node. The number of queries may be denoted by L. The number of votes that one voter can cast into all queries may be limited to $S_{max}$. A list of N vote nodes may be determined before the voting is initiated. The voter management node may hold personal authentication data of all N vote nodes before the voting is conducted. The personal authentication data of the voter held by the voter management node may be referred to as S-DID$_i$. Examples of the personal authentication data may be at least one of an iris image, a fingerprint image, an ID photo image, voice data, or public authentication data, but are not limited thereto. For each i-th vote node, personal authentication data may be referred to as DID$_i$. In the operating method of the embodiment, after each vote node performs self-verification on the correctness of all voting processes, related zero-knowledge proofs may be uploaded to the blockchain.

First, the voter management node 2 may provide the encryption base g to each vote node (S1). The vote node 1 may generate a signature public key ($p_i$, $q_i$) and a signature private key ($s_i$). The vote node 1 may generate a group encryption public key (pk$_i$) and a group encryption private key (sk$_i$) by using the encryption base g. The vote node may transmit the public key to the voter management node (S2).

Figure 3:
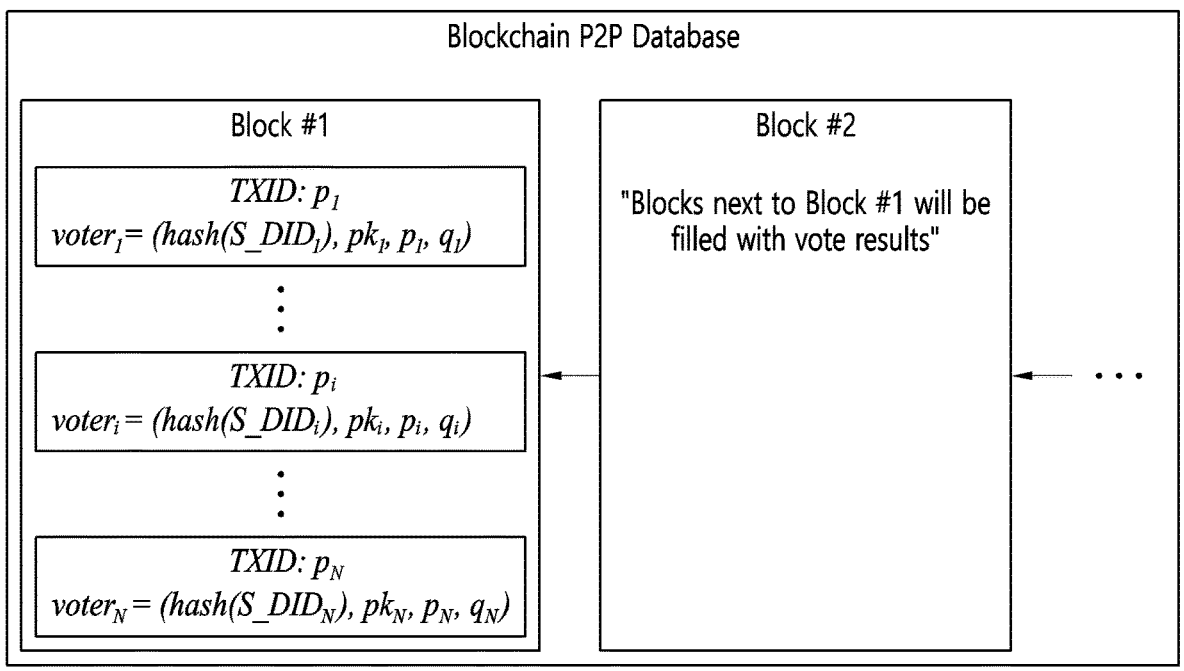
FIG. 3 shows upload data of a vote node which is uploaded to a blockchain.

The voter management node 2 may upload data of each vote node to the blockchain 3 as shown in FIG. 3 (S3). Other data uploaded to the blockchain 3 may also be uploaded in the same structure although different in contents.

The voter management node 2 may upload a smart contract (S3). Smart contracts may include a smart contract module for voting and proving and another smart contract module for tallying and verification. Identification information (DID) of each vote node 1 previously held by the voter management node may be registered in the blockchain.

The voting may be performed by the first smart contract module 41. The vote node may perform the voting by using the first smart contract module 41.

The first smart contract module 41 may be executed by each vote node to identify the right to vote, to generate a unique identification number, and to create an intention choice of each vote node (S4). Zero-knowledge proofs may be generated for the validity of the identification number and the intention choice.

More specifically, the first smart contract module 41 may confirm voting rights of vote nodes by comparing the personal identification information of each vote node (Cert), may generate identification number (voteID$_i$) for each vote node, may generate zero-knowledge proof (proof_voteID$_i$) for the vote node identification, and may upload the vote result (ballot$_i$).

In creating the intention choice of L queries on the agenda, an (L+1)th field may be added in addition to the L queries. If this additional field is filled by a nonzero, the corresponding ballot may be treated as a blank ballot later. In this manner, the vote node may cast a blank ballot.

Thereafter, it may be determined whether the sum of the field values does not exceed a maximum value ($S_{max}$). If the sum of the field values exceeds the maximum value, the corresponding ballot may be invalidated as an abnormality.

Thereafter, the group public key (yk$_i$) may be generated, the group encryption (ENC) may be performed by using the group public key, and zero-knowledge proof (proof_voteENC$_i$) for the group encryption may be generated.

Thereafter, the voting may be performed again if an error occurs in either the last confirmation of the voting rights of the vote node (Cert), the zero-knowledge proof (proof_voteID$_i$) for the vote node identification, or the zero-knowledge proof (proof_voteENC$_i$) for the group encryption.

If the voting is finished, the personal identification information (DID$_i$) and the private key ($s_i$, sk$_i$) are deleted from the smart contract modules.

If the voting is finished, the first smart contract module 41 uploads the vote result (ballot$_i$) of the i-th vote node to the blockchain 3 (S5). The uploaded vote result may include the vote node identification information (voteID$_i$), the zero-knowledge proof (proof_voteID) for the vote node identification, the vote execution time (time_publish), the generation of the group public key (yk$_i$), the group encryption information (ENC$_{G(i)}$(vote$_i$)), and the zero-knowledge proof (proof_voteENC$_i$) for the group encryption.

The voting process (S4) and the vote result uploading process (S5) are performed by the first smart contract module. For details, see Algorithm 4.

---

Algorithm 4]

INPUTS: DID$_i$, $p_i$, $q_i$, $s_i$, vote$_i$ = ($x_{i,1}$, ... $x_{i,L+1}$); pk$_i$, sk$_i$
INITIALIZTION: voteID$_i$ = null and isvalid = 0.
PROCESS:
  1. Download voter$_i$ = (hash(S_DID$_i$), pk$_i$, $p_i$, $q_i$) for all i from blockchain.
  2. Cert = hash(DID$_i$) $\wedge$ hash(S_DID$_i$).
  3. If Cert = 1, do
     A. voteID$_i$ = sign(hash(DID$_i$), $s_i$)
     B. proof_voteID$_i$ = ZKP(process2, verify(voteID$_i$, $p_i$, $q_i$))
     C. If $x_{i,L+1} \neq 0$, do $x_{i,1} \neq 0$, $x_{i,2} \neq 0$, ... , $x_{i,L} \neq 0$
     D. If $\Sigma_{i=1}^{L} x_{i,j} \leq S_{max}$, $\Sigma_{l=1}^{L} x_{i,l}$, do isvalid = 1.
     E. yk$_i$ = ($\Pi_{j=i+1}^{N}$ pk$_j$)/($\Pi_{j-1}^{i-1}$ pk$_j$).
     F. ENC$_{G(i)}$ (vote$_i$) = (yk$_i$)$^{sk_i}$ g$^{vote_i}$.

| Algorithm 4] |
|---|
| G. proof_voteENC$_i$ = ZKP(process3-C,process3-D,DEC$_{G(i)}$ (ENC$_{G(i)}$ (vote$_i$)))<br>4. If Cert = 0 or ZKP_verify(proof_voteID$_i$) = 0 or<br>   ZKP_verify(proof_voteENC$_i$) = 0, then return an error message.<br>5. Delete vote$_i$, DID$_i$, s$_i$, sk$_i$<br>OUTPUT: Upload<br>voteID$_i$,ENC$_{G(i)}$(vote$_i$), proof_voteID$_i$, proof_voteENC$_i$ to blockchain |

In Algorithm 4, ZKP(operation) is a function of generating zero-knowledge proof that guarantees the correctness of the operation processes of the input operations.

In Algorithm 4, ZKP_verify(proof) is a function of verifying the validity of the input zero-knowledge proof.

After the voting of all vote nodes is finished, the tallying may be performed.

The tallying may be performed by the second smart contract module 42. The second smart contract module 42 may obtain the private key s$_0$ for initiating the tallying from the voter management node 2 and the vote result from the blockchain (S6).

The second smart contract module 42 may reject the tallying if the obtained private key so is incorrect.

The second smart contract module 42 may obtain information from the blockchain and find out the information recorded thereon. In this case, the information may mean generating a single piece of information by linking pieces of information about all blocks of the blockchain. In this case, the information may not mean individually decrypting the group encryption of vote results.

The second smart contract module 42 may find out the tallying result of the intention choices without decrypting the intention choices (S7). As described above, this operation is performed by the group encryption.

The second smart contract module 42 may perform the verification (ZKP_verify(proof_voteID$_i$)) of the zero-knowledge proof (proof_voteID$_i$) for the corresponding vote node and the verification (ZKP_verify(proof_voteENC$_i$)) of the zero-knowledge proof (proof_voteENC$_i$) for the group encryption.

The second smart contract module uses the most recent vote result (ballot$_i$) if there are two or more ballots from the same vote node identification number. In this manner, the final intention of the vote node may be determined by using the latest information when a vote node has voted more than once.

Thereafter, the second smart contract module 42 may upload the tallying result to the blockchain 3 (S8).

The basic principles of the voting that the voting system should have may include the followings.
- Correctness: All valid votes are counted accurately in the tallying result.
- Integrity: A means for verifying the vote result is required to prevent forgery of the vote result.
- Soundness: Interference by fraudulent voters is blocked and fraudulent votes are not counted.
- Legality: The right to vote is required to vote.
- Singleness: A valid voter can participate only once.
- Confidentiality: The confidentiality of voters and vote results is ensured.
- Independency: The tallying result during voting does not influence the remaining votes.

The following describes that the system and the operating method according to the present disclosure keep the above-described principles.

First, the correctness can be addressed by the following reason.

Voters can self-verify the validity of their votes by using the voting smart contract. The proof on which the validity self-verification of the voting is performed can be generated. The voting validity proof can be verified by an unspecified number of blockchain verifiers (miners). The tallying smart contract module can verify the validity of the voting once more. The verified proof and encrypted voting contents can be recorded together on the blockchain, making it immutable. All votes can be counted collectively by the tallying smart contract.

The integrity can be addressed by the following reason. The proof that the voting contents were written by the voter can be recorded on the blockchain together with the encrypted voting data, making it immutable. If the voting data is manipulated, the verification of the proof is impossible. Thus, it can be treated as an invalid vote. Anyone can reproduce the tallying result after the voting data and the proofs are verified.

The soundness can be addressed by the following reason. All voters can write the voting contents, can self-verify that the vote is legal, and can record the proof on the blockchain. If the voting contents are false, the proof is be unverifiable. The voting contents recorded together with the unverifiable proof may be invalidated.

The legality can be addressed by the following reason. All voters can self-execute personal authentication and can record the proof on the blockchain together with the voting contents. If the personal authentication proof is unverifiable, the voting contents recorded together are invalidated by the tallying smart contract module.

The singleness can be addressed for the following reason. Each voter has a unique vote node identification number. The vote node identification number is generated by using the DID and the private key of the voter, and it has to be verifiable by using the public key of the pre-registered voter. Since one voter pre-registers only one public key, one voter can generate only one identification number. The voters can self-verify the validity of the identification number by using their public keys, can generate the proof, and can record the proof on the blockchain together with the identification number. If the proof for the validity of the identification number is unverifiable, the votes recorded together are invalidated by the tallying smart contract module.

The confidentiality can be addressed by the following reason.

The voters can directly generate the vote node identification number by using their private keys. Since the voter records only the vote node identification number on the blockchain, the third party who does not know the private key cannot infer the relationship between the voter and the identification number. Since the voting contents are encrypted and disclosed and the voting contents are not decrypted even during the tallying, the third party cannot infer the relationship between the identification number and the voting contents.

The independency can be addressed by the following reason.

All voting contents can be encrypted and uploaded. The voting contents are not decrypted throughout the entire voting process, including the tallying and vote verification. If all votes are not completed by group encryption, the tallying may be impossible, and therefore every vote cannot be influenced by the other votes.

According to the above description, the advantages of the voting system and the operating method thereof according to the present disclosure can be understood.

According to the present disclosure, the e-voting system can be operated in a state of maintaining the zero-knowledge proof and being not affected by the trust of the third party.

What is claimed is:

1. An operating method of a blockchain e-voting system, the system comprising a voter management unit hosting an e-voting and at least two vote units participating in the e-voting, a first smart contract unit executing the e-voting, and a second smart contract unit executing tallying executed e-voting by the first smart contract unit, the operating method comprising:
   providing, by a voter management unit, a same encryption base to each of at least two vote units;
   generating, by at least one of the at least two vote units, a group encryption public key ($pk_i$) and a group encryption private key ($sk_i$) by using the encryption base, and a signature public key ($p_i$, $q_i$) and a signature private key ($s_i$);
   transmitting, by at least one of the at least two vote units, the group encryption public key ($pk_i$) and the signature public key ($p_i$, $q_i$) to the voter management unit;
   transmitting, by at least one of the at least two vote units, the signature public key ($p_i$, $q_i$) and the signature private key ($s_i$) to the first smart contract unit;
   executing, by the first smart contract unit,
   1) identifying at least one of the at least two vote units,
   2) performing a signature of at least one of the at least two vote units,
   3) group execution of at least one of the at least two vote units;
   4) writing intention choice of at least one of the at least two vote units;
   5) performing zero-knowledge proof for the performing the signature and the zero-knowledge proof for the intention choice operation;
   uploading, by a first smart contract unit, a vote result to the blockchain, wherein the vote result uploaded to the blockchain by the first smart contract unit includes a vote execution time (time_publish);
   performing, by a second smart contract unit, tallying by the steps of:
   1) uploading before tallying by the second smart contract unit, by the voter management unit, data of at least one of the at least two vote units to a blockchain;
   2) obtaining a tallying private key ($s_O$) from the voter management unit,
   3) performs verification (ZKP_verify(proof_voteID$_i$)) of zero-knowledge proof (proof_voteID$_i$) for vote unit identification and verification (ZKP_verify (proof_voteENC$_i$)) of zero-knowledge proof (proof_voteENC$_i$) for the group encryption;
   uploading a result of the tallying to the blockchain by the second smart contract unit,
   wherein the voter management unit is configured to pre-register a first identification information of the at least one of the at least two vote units and upload the first identification information to the blockchain,
   wherein the at least one of the at least two vote units is configured to input second identification information asserted by the at least one of the at least two vote units to the first smart contract unit, and
   wherein the first smart contract unit is configured to confirm the at least one of the at least two vote units by comparing the first identification information with the second identification information,
   wherein after the voting is finished, the first and second identification information (DID$_i$), the signature private key ($s_i$), and the group encryption private key ($sk_i$) are deleted.

2. The operating method of claim 1, wherein smart contracts of the first and second smart contract units are uploaded to the blockchain by the voter management unit.

3. The operating method of claim 1, wherein the data of at least one of the at least two vote units include identification information of each of at least two vote units previously pre-registered by the voter management unit,
   wherein at least one of the at least two vote units inputs asserted identification information thereof to the first smart contract unit, and
   wherein the first smart contract unit confirms voting rights of at least one of the at least two vote units by comparing the pre-registered identification information and the asserted identification information.

4. The operating method of claim 1, wherein a field for identifying a blank ballot is added to the intention choice.

* * * * *